(12) United States Patent
Kwon et al.

(10) Patent No.: US 9,125,206 B2
(45) Date of Patent: Sep. 1, 2015

(54) APPARATUS AND METHOD FOR PERFORMING RESOURCE ALLOCATION AND COMMUNICATION IN A WIRELESS COMMUNICATION SYSTEM, AND SYSTEM USING SAME

(71) Applicant: Samsung Electronics Co., Ltd., Gyeonggi-do (KR)

(72) Inventors: Hwan-Joon Kwon, Gyeonggi-do (KR); Yu-Chul Kim, Seoul (KR); Byung-Sik Kim, Seoul (KR); Dong-Hee Kim, Gyeonggi-do (KR); Jae-Chon Yu, Gyeonggi-do (KR); Jin-Kyu Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 70 days.

(21) Appl. No.: 13/854,544

(22) Filed: Apr. 1, 2013

(65) Prior Publication Data

US 2013/0208687 A1 Aug. 15, 2013

Related U.S. Application Data

(63) Continuation of application No. 11/717,827, filed on Mar. 14, 2007, now Pat. No. 8,411,660.

(30) Foreign Application Priority Data

Mar. 14, 2006 (KR) ........................ 10-2006-0023750
Mar. 27, 2006 (KR) ........................ 10-2006-0027683
Apr. 25, 2006 (KR) ........................ 10-2006-0036984

(51) Int. Cl.
*H04W 72/04* (2009.01)
*H04L 1/18* (2006.01)
(Continued)

(52) U.S. Cl.
CPC ......... *H04W 72/0453* (2013.01); *H04L 1/1812* (2013.01); *H04L 5/0012* (2013.01);
(Continued)

(58) Field of Classification Search
CPC .............. H04W 72/0453; H04W 28/04; H04L 1/1812; H04L 5/0007; H04L 5/0012; H04L 5/0037; H04L 5/0053; H04L 5/0092
USPC ........... 370/203–208, 210, 329, 344; 375/132
See application file for complete search history.

(56) References Cited

U.S. PATENT DOCUMENTS 7,515,562 B2   4/2009   Lim et al.
7,903,619 B2   3/2011   Yun et al.
(Continued)

FOREIGN PATENT DOCUMENTS

CN   1267153   9/2000
CN   1723647   1/2006
(Continued)

OTHER PUBLICATIONS

Samsung, "Downlink Channelization and Multiplexing for EUTRA", Jun. 20, 2005, 3GPP TSG RAN WG1 Ad Hoc on LTE, pp. 1-9.*
(Continued)

*Primary Examiner* — Paul H Masur
(74) *Attorney, Agent, or Firm* — The Farrell Law Firm, P.C.

(57) ABSTRACT

Methods and apparatus are provided for transmitting and receiving uplink data in a wireless communication system. Hopping-related information is received at a mobile station from a base station. Resource allocation information is received at the mobile station from the base station. The uplink data is transmitted from the mobile station to the base station through at least one resource determined based on a sequence for sub-band hopping and a sequence for local hopping.

16 Claims, 9 Drawing Sheets

(51) Int. Cl.
    *H04L 5/00*     (2006.01)
    *H04W 28/04*    (2009.01)
    *H04W 72/00*    (2009.01)

(52) U.S. Cl.
    CPC ............ *H04L5/0053* (2013.01); *H04L 5/0092*
        (2013.01); *H04L 5/0007* (2013.01); *H04L*
        *5/0037* (2013.01); *H04W 28/04* (2013.01);
                                *H04W 72/00* (2013.01)

(56) References Cited

U.S. PATENT DOCUMENTS

| | | |
|---|---|---|
| 2004/0264507 A1 | 12/2004 | Cho et al. |
| 2005/0163194 A1 | 7/2005 | Gore et al. |
| 2005/0169229 A1 | 8/2005 | Cho et al. |
| 2005/0286408 A1 | 12/2005 | Jin et al. |
| 2006/0072649 A1 | 4/2006 | Chang et al. |
| 2006/0203707 A1* | 9/2006 | Lee et al. ............. 370/208 |
| 2007/0201398 A1* | 8/2007 | Yang et al. ............ 370/329 |
| 2007/0218915 A1* | 9/2007 | Yang et al. ............ 455/450 |
| 2008/0037664 A1* | 2/2008 | Yang et al. ............ 375/260 |
| 2008/0187136 A1 | 8/2008 | Zhang et al. |
| 2009/0156226 A1 | 6/2009 | Chapman |

FOREIGN PATENT DOCUMENTS

| | | |
|---|---|---|
| EP | 1 612 980 | 1/2006 |
| KR | 1020050000709 | 1/2005 |
| KR | 1020050014764 | 2/2005 |
| KR | 1020060002432 | 1/2006 |
| WO | WO03026159 | 3/2003 |
| WO | WO 2005/074155 | 8/2005 |
| WO | WO 2006/047851 | 5/2006 |

OTHER PUBLICATIONS

3gPP RAN WG1 LTE ad hoc meeting Helsinki, Finland, Jan. 23-25, 2006.

Motorola, "EUTRA SC-FDMA Uplink Resource Block, Resource Allocation & TP", R1-060389, 3GPP TSG RAN1#44, Feb. 13-17, 2006.

NEC Group, "Performance Comparison of Distributed FDMA and Localised FDMA with Frequency Hopping for EUTRA Uplink", R1-051073, TSG-RAN WG1 Meeting #42 Bis, Oct. 10-14, 2005.

Motorola, "Further Topics on Uplink DFT-SOFDM for E-UTRA", R1-051033, 3GPP TSG RAN WG1 #42 bis, Oct. 10-15, 2005.

Chinese Office Action dated Jul. 2, 2015 issued in counterpart application No. 201210206418.9.

* cited by examiner

APPARATUS AND METHOD FOR PERFORMING RESOURCE ALLOCATION AND COMMUNICATION IN A WIRELESS COMMUNICATION SYSTEM, AND SYSTEM USING SAME

PRIORITY

This application is a Continuation Application of U.S. patent application Ser. No. 11/717,827, which was filed in the U.S. Patent and Trademark Office on Mar. 14, 2007, issued on Apr. 2, 2013 as U.S. Pat. No. 8,411,660, and which claims the benefit under 35 U.S.C. §119(a) of a Korean Patent Application filed in the Korean Intellectual Property Office on Mar. 14, 2006 and assigned Serial No. 2006-23750, a Korean Patent Application filed in the Korean Intellectual Property Office on Mar. 27, 2006 and assigned Serial No. 2006-27683, and a Korean Patent Application filed in the Korean Intellectual Property Office on Apr. 25, 2006 and assigned Serial No. 2006-36984, the disclosures of each of which are incorporated herein by reference.

BACKGROUND OF THE INVENTION

1. Field of the Invention

The present invention generally relates to an apparatus and method for allocating resources in a wireless communication system and a system using the same, and in particular, to an apparatus and method for allocating resources in a wireless communication system using Frequency Division Multiple Access (FDMA), and a system using the same.

2. Description of the Related Art

Wireless communication systems have been developed to allow users to perform location independent communication. A wireless communication system providing a voice service is a typical wireless communication system. With the rapid progress of communication technologies, wireless communication systems providing voice service are developing to provide data service.

In wireless communication systems, research on various methods has been conducted for data service, and studies have been conducted on a method for providing data service using FDMA. In particular, extensive research has been conducted on Orthogonal Frequency Division Multiplexing (OFDM), a kind of FDMA, to provide a high-speed data service not only in a wireless system but also in a wired system. OFDM, a scheme for providing data using multiple carriers, is a kind of Multi-Carrier Modulation (MCM) that converts a serial input symbol stream into parallel symbol streams, and modulates them with orthogonal sub-carriers, i.e. sub-carrier channels, before transmission. An OFDM-based system that distinguishes several users with the sub-carriers, i.e. an OFDM-based system that supports several users in the manner of allocating different sub-carriers to different users, is generally called Orthogonal Frequency Division Multiple Access (OFDMA).

With reference to FIG. 1, a description will now be made of an example in which resources are allocated in an OFDMA system. FIG. 1 shows an example of transmitting data with allocated resources by a Mobile Station (MS) in a general OFDMA system.

In FIG. 1, reference numeral 101 in a lattice denotes a particular resource which is composed of one or multiple sub-carriers in the frequency domain, and is composed of one or multiple OFDM symbols in the time domain. The parts hatched by slanted lines indicate resources allocated for data transmission by a first MS (MS1), and the parts hatched by double-slanted lines indicate resources allocated for data transmission by a second MS (MS2). As used herein, the term 'resources' refers to resources in the time and frequency domains, and indicates OFDMA symbols in the time axis and sub-carriers in the frequency axis. The resources used by the MS1 and the MS2 for data transmission continuously use specific frequency bands without time variation. This resource allocation scheme or data transmission scheme selects a frequency region having a good channel state and allocates resources in the selected frequency domain to each MS, thereby maximizing system performance with limited system resources.

For example, as to the wireless channel that the MS1 experiences, the parts indicated by slanted lines in the frequency domain are better than other frequency domains. However, as to the wireless channel that the MS2 experiences, the parts indicated by double-slanted lines in the frequency domain are better than other frequency domains. A scheme of selecting the frequency region having a good channel response from the frequency domains and allocating resources in the selected frequency domain is generally called a 'frequency selective resource allocation' or 'frequency selective scheduling' scheme. Although the foregoing description has been made for an uplink, i.e. data transmission from an MS to a Base Station (BS) for convenience, by way of example, the same can also be applied to a downlink, i.e. data transmission from a BS to an MS. For the downlink, the parts hatched by slanted lines and the parts hatched by double-slanted lines indicate the resources used by the BS to transmit data to the MS1 and the resources used by the BS to transmit data to the MS2, respectively. However, the frequency selective scheduling is not always available. For example, for an MS moving at high speed, the frequency selective scheduling is unavailable due to a fast change in the channel state. The reason is as follows. After a BS scheduler selects a frequency region having a better channel state for a particular MS and allocates resources in the selected frequency domain to the MS, the channel environment may have already changed considerably at the time the MS receives resource allocation information from the BS and actually transmits data using the allocated resources. Therefore, it cannot guarantee that the selected frequency region has a better channel state. In this case, a frequency hopping scheme is available. It should be noted that the use of the frequency hopping scheme is not limited to the nonuse of the frequency selective scheduling scheme.

FIG. 2 shows an example in which a frequency hopping scheme is used in a general OFDMA system. Reference numeral 201 denotes a particular resource which is equal to that denoted by reference numeral 101 in FIG. 1.

Referring to FIG. 2, it is noted that resources used by one MS for data transmission suffer continuous variation (hopping) in the time domain. This frequency hopping process contributes to randomization of channel quality and interference that the data transmission experiences.

However, the use of only the frequency hopping scheme in OFDMA or the scheme of allocating a particular frequency band for a predetermined time cannot increase the resource efficiency.

Hybrid Automatic Repeat reQuest (HARQ) technology is one of the major technologies used for increasing data transmission reliability and data throughput in the general wireless communication system. HARQ refers to a combined technology of Automatic Repeat Request (ARQ) and Forward Error Correction (FEC). ARQ, technology popularly used in wire/wireless data communication systems, refers to technology in which a transmitter assigns a sequence number to a transmission data packet according to a predetermined scheme and transmits the packet, and a data receiver sends to the transmitter a retransmission request for a packet with a missing number among the received packets using the numbers, thereby achieving reliable data transmission. FEC refers to the technology that adds redundant bits to transmission data according to a rule and transmits the data, like convolutional coding or turbo coding, thereby overcoming noises occurring in a data transmission/reception process and errors occurring in the fading environment. In this manner, FEC demodulates the originally transmitted data. In a system using HARQ, which is the combined technology of ARQ and FEC, a data receiver determines presence/absence of errors by performing a Cyclic Redundancy Check (CRC) check on the data decoded through an inverse FEC process on the received data. If the CRC check result indicates absence of error, the data receiver feeds back an Acknowledgement (ACK) signal to a transmitter so the transmitter may transmit the next data packet. However, if the CRC check result indicates presence of error in the received data, the data receiver feeds back a Non-Acknowledgement (NACK) signal to the transmitter so the transmitter may retransmit the previously transmitted packet. The receiver combines the retransmitted packet with the previously transmitted packet, thereby obtaining energy and coding gain. HARQ, compared with the conventional ARQ not supporting the combing, can obtain higher performance.

FIG. 3 shows an example in which data is transmitted based on HARQ. In FIG. 3, the horizontal axis indicates a time axis. Blocks 301, 302, 303 and 311 each show transmission of one sub-packet. That is, a general HARQ system transmits several sub-packets in order to successfully transmit one packet. A number shown in each block indicates an identifier for a corresponding sub-packet. For example, a sub-packet indicated by '0' is a sub-packet, which is initially transmitted in a process of transmitting one packet. If the sub-packet indicated by '0' is first transmitted, a data receiver receives the sub-packet and then attempts demodulation thereon. It is shown in FIG. 3 that demodulation of the first transmitted sub-packet is failed. That is, if it is determined that there is an error in the data transmission, the receiver feeds back a NACK signal. A transmitter receiving the NACK signal transmits the next sub-packet, i.e. a sub-packet indicated by a sub-packet identifier '1'. Upon receipt of the sub-packet with a number '1', the data receiver combines the sub-packet #0 with the sub-packet #1, and then reattempts the demodulation. It is shown in FIG. 3 that the data receiver fails in the demodulation even on the combined sub-packet of the sub-packet #0 and the sub-packet #1. Therefore, the receiver feeds back a NACK signal again because there is an error in the data transmission. The above process is repeated until the transmission sub-packet is successfully received at the data receiver, or repeated until the transmission reaches a maximum number of retransmissions. It is shown in FIG. 3 that the receiver succeeds in decoding when it receives a sub-packet #2 corresponding to third transmission. In order to prevent the receiver from continuously transmitting the same sub-packet due to the continuous failure in the decoding of the sub-packet, a particular system may limit the number of retransmissions.

HARQ is popularly used in wireless communication systems, as a very useful method. Therefore, there is a need for the use of HARQ for resource allocation even in wireless communication systems using OFDMA (OFDMA wireless communication systems).

SUMMARY OF THE INVENTION

The present invention addresses at least the problems and/or disadvantages described above and provides at least the advantages described below. Accordingly, an aspect of the present invention is to provide an apparatus and method capable of efficiently allocating resources in a wireless communication system, and a system using the same.

Another aspect of the present invention is to provide an apparatus and method capable of efficiently allocating resources in an OFDMA wireless communication system, and a system using the same.

A further aspect of the present invention is to provide an apparatus and method capable of efficiently allocating resources in an OFDMA wireless communication system using HARQ, and a system using the same.

According to one aspect of the present invention, a method is provided for transmitting an uplink data by a mobile station in a wireless communication system. Hopping-related information is received from a base station. Resource allocation information is received from the base station. The uplink data is transmitted through at least one resource determined based on a sequence for global hopping and a sequence for local hopping, if global hopping and local hopping are enabled.

According to another aspect of the present invention, a method is provided for receiving an uplink data by a base station in a wireless communication system. Hopping-related information is transmitted to a mobile station. Resource allocation information is transmitted to the mobile station. The uplink data is received through at least one resource determined based on a sequence for sub-band hopping and a sequence for local hopping.

According to further another aspect of the present invention, an apparatus is provided for transmitting an uplink data in a wireless communication system. The apparatus includes a receiver for receiving resource allocation information and hopping-related information from a base station. The apparatus also includes a controller for determining at least one resource for transmitting the uplink data based on a sequence for sub-band hopping and a sequence for local hopping. The apparatus further includes a transmitter for transmitting the uplink data through the determined at least one resource.

According to yet another aspect of the present invention, an apparatus is provided for receiving an uplink data in a wireless communication system. The apparatus includes a transmitter for transmitting resource allocation information and hopping-related information to a mobile station. The apparatus also includes a controller for determining at least one resource for receiving the uplink data based on a sequence for sub-band hopping and a sequence for local hopping. The apparatus further includes a receiver for receiving the uplink data through the determined at least one resource.

According to still another aspect of the present invention, a method is provided for transmitting an uplink data by a mobile station in a wireless communication system. Hopping-related information is received from a base station. Resource allocation information is received from the base station. The uplink data is transmitted through at least one resource of sub-bands designated by the base station.

According to another aspect of the present invention, a method is provided for receiving an uplink data by a base station in a wireless communication system. Hopping-related information is transmitted to a mobile station. Resource allocation information is transmitted to the mobile station. The uplink data is received through at least one resource of sub-bands determined by the base station.

According to a further aspect of the present invention, an apparatus is provided for transmitting an uplink data in a wireless communication system. The apparatus includes a receiver for receiving resource allocation information and hopping-related information from a base station. The apparatus also includes a controller for determining at least one resource for transmitting the uplink data in sub-bands designated by the base station. The apparatus further includes a transmitter for transmitting the uplink data through the determined at least one resource.

According to an additional aspect of the present invention, an apparatus is provided for receiving an uplink data in a wireless communication system. The apparatus includes a transmitter for transmitting resource allocation information and hopping-related information to a mobile station. The apparatus also includes a controller for determining at least one resource of sub-bands for receiving the uplink data. The apparatus further includes a receiver for receiving the uplink data through the determined at least one resource.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
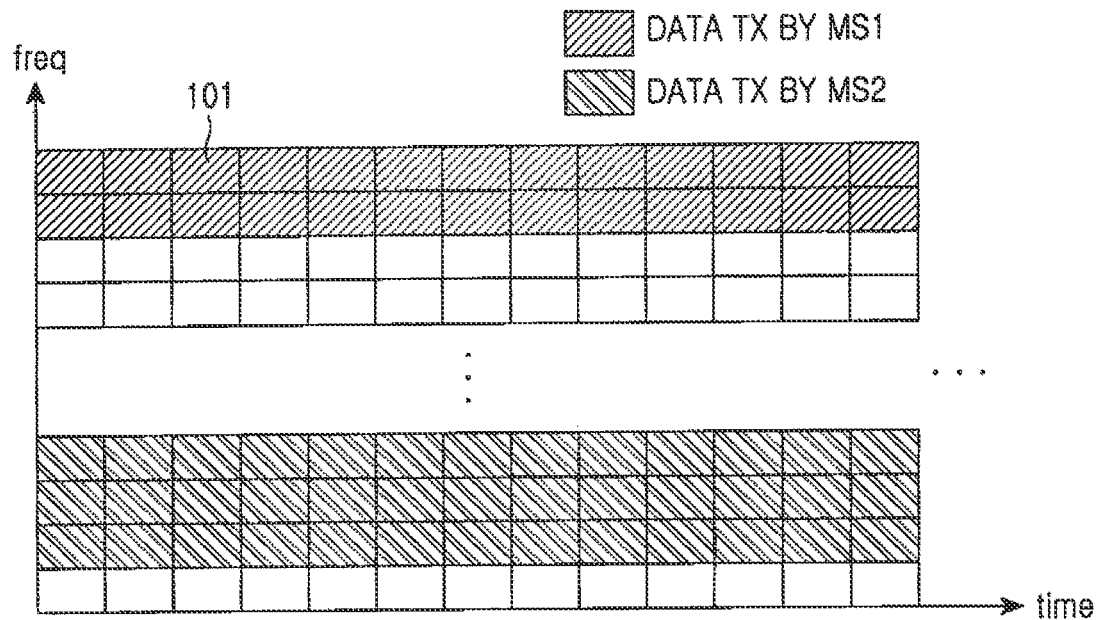
FIG. 1 illustrates an example of transmitting data with allocated resources by an MS in a general OFDMA system.
Figure 2:
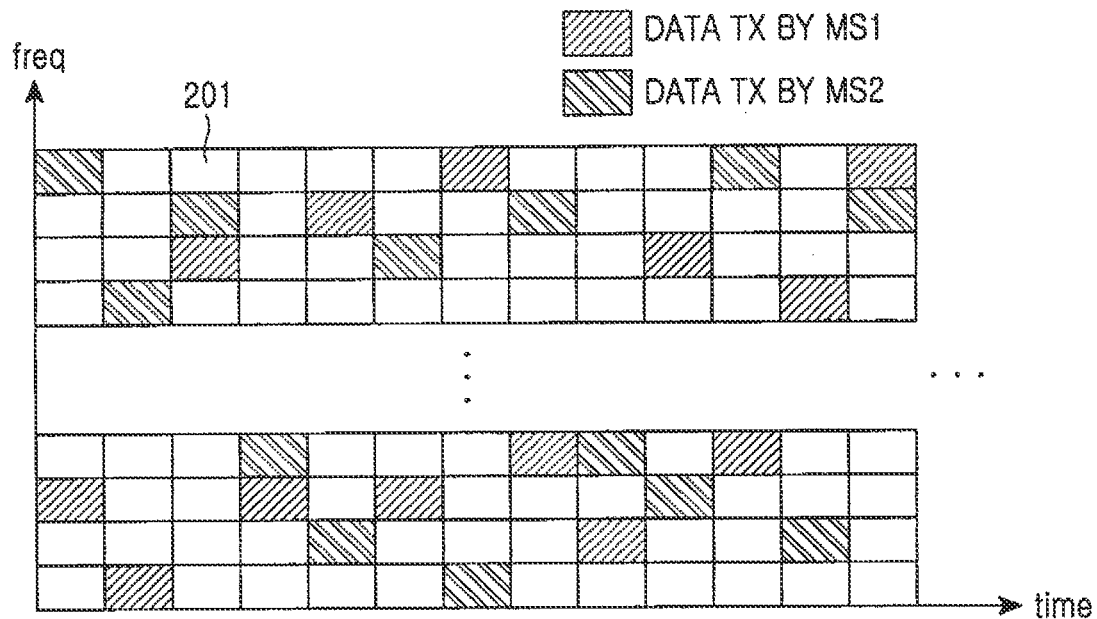
FIG. 2 illustrates an example in which a frequency hopping scheme is used in a general OFDMA system.
Figure 3:
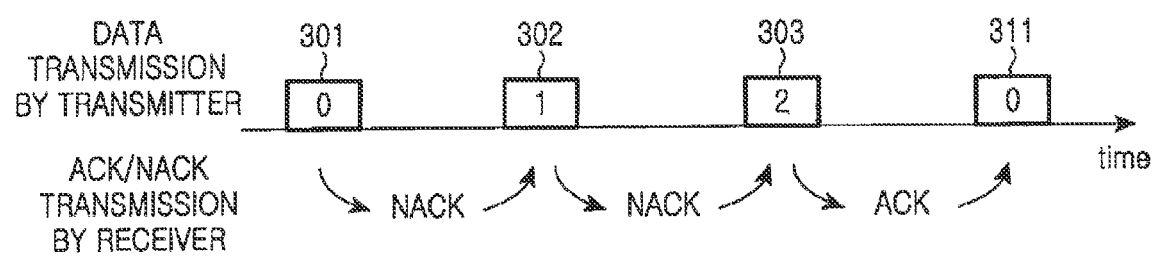
FIG. 3 illustrates an example in which data is transmitted based on HARQ.

Preferred embodiments of the present invention will now be described with reference to the drawings. In the following description, descriptions of known functions and configurations incorporated herein have been omitted for clarity and conciseness.

Although a description of the present invention is made below with reference to an Orthogonal Frequency Division Multiple Access (OFDMA) system for convenience, a resource allocation scheme of the present invention can be used not only for an OFDMA system but also for any Frequency Division Multiple Access (FDMA) system. In addition, although the present invention is applied to resource allocation to a Mobile Station (MS) by a Base Station (BS) for convenience, the present invention can be applied to both downlink transmission and uplink transmission in the same manner.

For a description of a combined application method of frequency selective resource application, frequency hopping and Hybrid Automatic Repeat reQuest (HARQ), provided by the present invention, and a transmission/reception apparatus using the same, definitions of terms used herein are as follows.

(1) Sub-band means a frequency band unit, in which frequency selective resource allocation or frequency selective scheduling is performed. That is, it is assumed that when frequency selective resource allocation is available, a resource allocation entity (scheduler) can determine relative superiority for channel quality in the sub-band unit in the frequency domain. For example, it is assumed that when the entire system band is 10 MHz and the sub-band is 625 KHz, the resource allocation entity can determine which of 16 sub-bands existing in the 10-MHz band is superior in channel quality.

(2) Wide-band means the entire system band, or a band in which a resource allocation scheme is applied independently. For example, when the entire system band is 10 MHz and resource allocation is applied for the 10 MHz, the wide-band is 10 MHz. However, when the 10 MHz is divided into two 5-MHz bands and resource allocation is independently applied for the two 5-MHz bands, the wide-band is 5 MHz.

(3) Sub-channel means a basic unit, in which resources are allocated to a particular MS. The sub-channel is composed of one or multiple sub-carriers in the frequency axis, and one or multiple OFDM symbols in the time axis. It should be noted that the present invention is not limited to a method of generating a specific sub-channel.

(4) Slot means a time axis unit, in which one sub-packet is transmitted. One slot is defined over an OFDM symbol corresponding to one or multiple sub-channels.

(5) Logical Channel indicates a logical channel allocated to a user. Generally, logical resources are defined independently of physical resources or channels in type.

(6) Physical Channel means physical resources which are actually allocated to the user. A type of the physical resources is determined depending on signal transmission scheme and multiple access scheme of the communication system, and there is a need to define a mapping relationship between the physical resources with the logical resources. For example, in an OFDMA transmitter, a group of multiple physical resources, which are defined by multiple OFDM symbols and multiple sub-carriers (or frequency resources), can be defined as one physical channel.

(7) Hopping refers to a physical channel mapped to one logical channel that can be fixed in terms of time. However, when the mapping relationship changes in terms of time according to a specific rule, this is called hopping. That is, hopping means an operation in which a logical channel-to-physical channel mapping method changes in order to achieve improvement of performance such as diversity gain or to achieve the security goal, in the physical channels.

(8) Hopping Sequence means a rule, based on which logical channels are mapped to physical channels. A sequence of numbers, given for expressing this rule, is the hopping sequence.

(9) Local Hopping indicates an operation in which mapping of a particular logical channel changes from a physical channel in a specific sub-band to the same or different physical channel in the same sub-band with the passage of time.

(10) Sub-band Hopping indicates an operation in which a sub-band over which a particular physical channel is transmitted, changes to the same or different sub-band.

(11) Global Hopping indicates an operation in which mapping of a particular logical channel changes from a physical channel in a specific sub-band to a physical channel in the same or different sub-band with the passage of time. The global hopping can be expressed as a merged operation of the local hopping and sub-band hopping operations.

(12) Local Hopping Sequence indicates a mapping rule between logical channels and physical channels in local hopping according to the time.

(13) Sub-band Hopping Sequence indicates a sequence of sub-bands transmitted according to the time when sub-band hopping is performed.

(14) Global Hopping Sequence indicates a mapping rule between logical channels and physical channels in global hopping according to the time.

Based on the above-defined terms, a description will now be made of a combined application method of frequency selective resource application, frequency hopping and HARQ, provided by the present invention, and a transmission/reception apparatus and a system using the same, for the following four embodiments.

1. First Embodiment

First, an amount of a sub-band is determined between a transmitter and a receiver. The determination is performed so a BS provides information on the amount of the sub-band to all MSs in its system. For example, if the determination is made so the entire system band is 10 MHz and the sub-band is 625 KHz, there are 16 sub-bands in the entire system band.

Second, the entire system band is divided into a band for Wide-Band Hopped HARQ (WBH-HARQ) and a band for Sub-Band Hopped HARQ (SBH-HARQ). The band for WBH-HARQ is characterized in that it is uniformly distributed over the entire band, and the band for SBH-HARQ is characterized in that it is a band except for the band for WBH-HARQ in a particular sub-band.

Third, the BS allocates a part or all of the band for WBH-HARQ to each MS, or allocates a part or all of the band for SBH-HARQ to each MS. The BS can allocate both a part or all of the band for WBH-HARQ, and a part or all of the band for SBH-HARQ, to one MS.

Fourth, an MS, allocated a part or all of the band for WBH-HARQ, transmits data while performing HARQ and frequency hopping restrictively on the band for WBH-HARQ. In this case, the BS and the MS perform hopping according to a rule defined by a global hopping sequence between them. The global hopping is composed of first performed local hopping and its successively performed sub-band hopping. In each hopping, mapping between logical channels and physical channels, and mapping between a sub-band over which logical channels are transmitted and a sub-band over which physical channels are transmitted, are defined as a local hopping sequence and a sub-band hopping sequence, respectively.

An MS, allocated a part or all of the band for SBH-HARQ, performs an HARQ operation while performing frequency hopping in the sub-band corresponding to the allocated band. In this case, the MS performs the frequency hopping operation on a band except for the band designated for WBH-HARQ in the sub-band. Similarly, the BS and the MS perform hopping according to a rule defined by a local hopping sequence between them.

Figure 4:
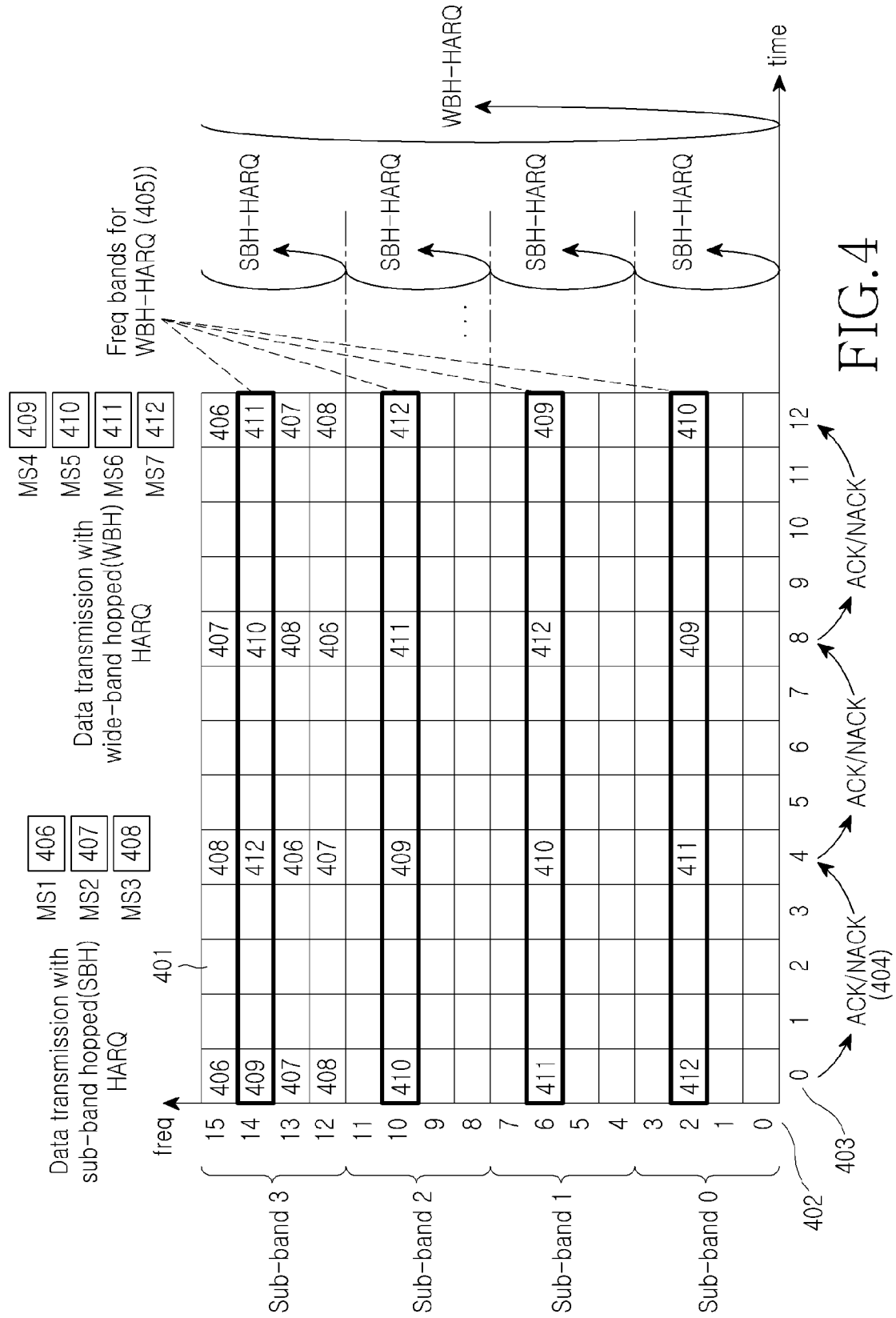
FIG. 4 conceptually illustrates allocation of frequency resources for communication according to a first embodiment of the present invention.

With reference to FIG. 4, a description will now be made of a resource allocation method according to a first embodiment of the present invention. The horizontal axis indicates a time axis, and the vertical axis indicates a frequency axis. One small block denoted by reference numeral 401 indicates one sub-channel. Numbers in the frequency axis denoted by reference numeral 402 indicate indexing for sub-channels in the frequency domain. Numbers in the time axis denoted by reference numeral 403 indicate indexing for slots in the time domain. In FIG. 4, one sub-band is composed of 4 sub-channels. That is, sub-channels #0~#3 constitute a sub-band #0, sub-channels #4~#7 constitute a sub-band #1, sub-channels #8~#11 constitute a sub-band #2, and sub-channels #12~#15 constitute a sub-band #4.

As described above, the entire band is composed of 4 sub-bands, and each sub-band is a unit in which frequency selective resource allocation is performed. Of the 16 sub-channels, sub-channels #2, #6, #10 and #14 are sub-channels for which WBH-HARQ is used. This is shown by reference numeral 405. In slot #0, a BS allocates sub-channels to MS1~MS7. In the example of FIG. 4, in slot #0, the BS allocates a sub-channel #15 to an MS1 406, allocates a sub-channel #13 to an MS2 407, and allocates a sub-channel #12 to an MS3 408. That is, the sub-channels other than the sub-channels, for which WBH-HARQ is used, are allocated to the three MSs. Therefore, the three MSs transmit data while performing HARQ and frequency hopping in the sub-bands (all correspond to the sub-band #3 in the example of FIG. 4) corresponding to their allocated sub-channels. Hopping sequences assigned to the MS1 406 are aligned physical channel numbers 15-13-12-15 allocated to the MS1 406. The MS1 406 is allocated a particular logical channel, and this is mapped to physical channels #15, #13, #12, #15, ... with the passage of time. The local hopping sequence is a mere example, and another rule or expression method is also possible. For example, such expression is also possible in which the local hopping sequence is 3-1-0-3 and a sub-band hopping sequence is fixed to 3-3-3-3. In this case, the final hopping sequence can be expressed as Equation (1).

$$\text{Global Hopping Sequence} = (\text{Sub-band Hopping Sequence}) * (\text{Number of Sub-channels per Sub-band}) + (\text{Local Hopping Sequence}) \quad (1)$$

It should be noted that the frequency hopping is performed in the sub-band corresponding to the allocated sub-channels except for the sub-channels for which WBH-HARQ is used. In the slot #0, the BS allocates the sub-channel #14 to an MS4 409, allocates the sub-channel #10 to an MS5 410, allocates the sub-channel #6 to an MS6 411, and allocates the sub-channel #2 to an MS7 412. The sub-channels #2, #6, #10 and #14 allocated to the four MSs are sub-channels for which WBH-HARQ is used. Therefore, the four MSs performs HARQ while performing frequency hopping in their allocated sub-channels for which WBH-HARQ is used. In this case, an aligned sequence of the physical channels allocated to, for example, the MS4 409, is 14-10-2-6, and these values are determined as values used for hopping. This sequence is determined depending on the local hopping sequence and the sub-band hopping sequence. In this case, the local hopping sequence is fixed to 2-2-2-2, and the sub-band hopping sequence is configured of 3-2-1-2. A sum of the two sequences gives 3*4+2-2*4+2-0*4+2-1*4+2, generating 14-10-2-6. Although the foregoing example shows a case where one MS is allocated one sub-channel, it should be noted that one MS can be allocated one or more sub-channels.

With reference to FIG. 4, a description will now be made of a process in which data is transmitted while frequency hopped-HARQ (SBH/WBH-HARQ) is being performed. The MS1 406 is allocated the sub-channel #15. The MS1 406 is allocated a sub-channel other than the sub-channels #2, #6,

10 and #14 for which WBH-HARQ is used. Therefore, during data transmission, the MS1 406 transmits data while performing SBH-HARQ on the sub-channels #12, #13 and #15, which are the remaining sub-channels obtained by excluding the sub-channel #14 used for WBH-HARQ from the sub-band #3 including the allocated sub-channel #15.

A description will now be made of a process in which SBH/WBH-HARQ is performed. The MS1 406 performs initial transmission in the sub-channel #15 of the slot #0. After the initial transmission, the MS1 406 receives a NACK signal from the BS as shown by reference numeral 404, and then performs first retransmission in a slot #4. That is, the MS1 406 transmits a sub-packet #1. During the retransmission, the MS1 406 performs frequency hopping by using the sub-channel #13 in the slot #4, i.e. by using the different frequency band from that used for the initial transmission. After performing the first retransmission, the MS1 406 receives again a NACK signal from the BS receiver, and then performs second retransmission in a slot #8. That is, the MS1 406 transmits a sub-packet #2. During the second retransmission, the MS1 406 performs frequency hopping by using the sub-channel #12 in the slot #8, i.e. by using the different frequency band from that used for the first retransmission. After performing the second retransmission, the MS1 406 now receives an ACK signal from the BS receiver, and then performs initial transmission on the new packet in a slot #12. That is, the MS1 406 transmits a sub-packet #0 for the new packet. During the initial transmission on the new packet, MS1 406 performs frequency hopping by using the sub-channel #15 in the slot #12. In the same manner, an MS2 407 and an MS3 408 also transmit data while performing SBH/WBH-HARQ in the sub-band.

The MS4 409 is allocated the sub-channel #14 in the slot #0. The MS4 409 is allocated one of the sub-channels #2, #6, #10 and #14, for which WBH-HARQ is used. Therefore, during data transmission, the MS4 409 performs HARQ while performing frequency hopping over the sub-channels #2, #6, #10 and #14, for which WBH-HARQ is used. A description will now be made of a process in which SBH/WBH-HARQ is performed. The MS4 409 performs initial transmission in the sub-channel #14 of the slot #0. After the initial transmission, the MS4 409 receives a NACK signal from the BS, and then performs a first retransmission in the slot #4. That is, the MS4 409 transmits the sub-packet #1. During the first retransmission, the MS4 409 performs frequency hopping by using the sub-channel #10 in the slot #4, i.e. by using the different frequency band from that used for the initial transmission. After performing the first retransmission, the MS4 409 receives again a NACK signal from the BS receiver, and then performs a second retransmission in the slot #8. That is, the MS4 409 transmits the sub-packet #2. During the second retransmission, the MS4 409 performs frequency hopping by using the sub-channel #2 in the slot #8, i.e. by using the different frequency band from that used for the first retransmission. After performing the second retransmission, the MS4 409 receives again a NACK signal from the BS receiver, and then performs a third retransmission in the slot #12. That is the MS4 409 transmits the sub-packet #3. During the third retransmission, the MS4 409 performs frequency hopping by using the sub-channel #6 in the slot #12. In the same manner, MS5 410, MS6 411 and MS7 412 also transmit data while performing SBH/WBH-HARQ in the wide-band.

2. Second Embodiment

First, an amount of a sub-band is determined between a transmitter and a receiver. The determination is performed so a BS provides information on the amount of the sub-band to all MSs in its system. For example, if the determination is made so the entire system band is 10 MHz and the sub-band is 625 KHz, there are 16 sub-bands in the entire system band.

Second, slots are divided into a slot used only for WBH-HARQ and a slot used only for SBH-HARQ.

Third, the BS allocates partial or entire band of the slot used only for WBH-HARQ to each MS, or allocates partial or entire band of the slot used only for SBH-HARQ to each MS. The BS can allocate, to one MS, both of the partial or entire band of the slot used only for WBH-HARQ and the partial or entire band of the slot used only for SBH-HARQ.

Fourth, an MS, allocated the partial or entire band of the slot used only for WBH-HARQ, transmits data while performing HARQ and frequency hopping over a wide-band restrictively on the slot used only for WBH-HARQ. The MS and the BS determine a hopping rule using a global hopping sequence between them. The global hopping sequence can be expressed as a combination of a local hopping sequence and a sub-band hopping sequence as described in the first embodiment. An MS, allocated the partial or entire band of the slot used only for SBH-HARQ, performs an HARQ operation while performing frequency hopping restrictively on the slot used only for SBH-HARQ, or restrictively on the sub-band corresponding to the allocated band. The MS and the BS determine a hopping rule using a local hopping sequence between them.

Figure 5:
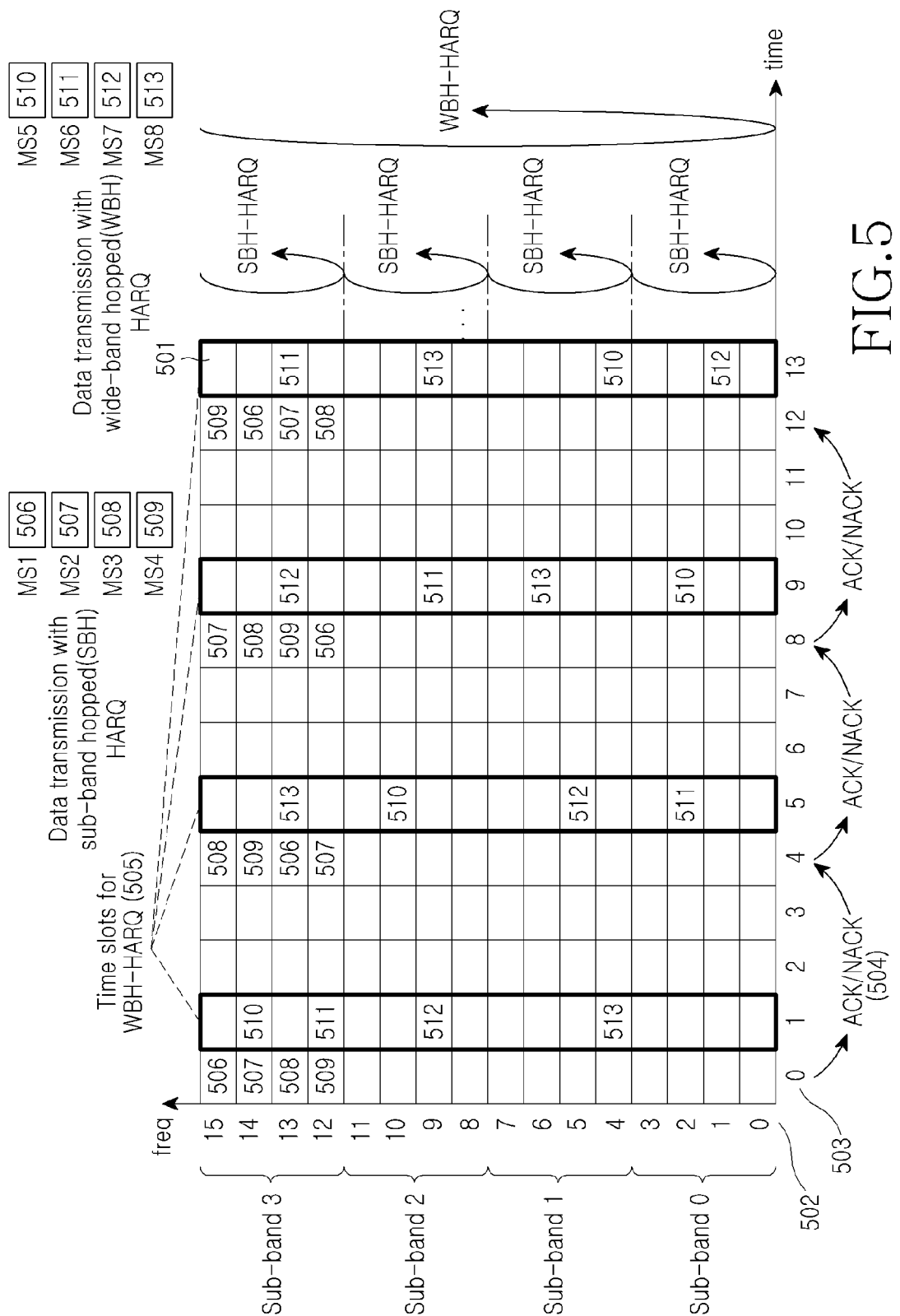
FIG. 5 conceptually illustrates allocation of frequency resources for communication according to a second embodiment of the present invention.

With reference to FIG. 5, a description will now be made of a second embodiment of the present invention. The horizontal axis indicates a time axis, and the vertical axis indicates a frequency axis. One small block denoted by reference numeral 501 indicates one sub-channel. Numbers in the frequency axis denoted by reference numeral 502 indicate indexing for sub-channels in the frequency domain. Numbers in the time axis denoted by reference numeral 503 indicate indexing for slots in the time domain. In FIG. 5, one sub-band is composed of four sub-channels. That is, sub-channels #0~#3 constitute a sub-band #0, sub-channels #4~#7 constitute a sub-band #1, sub-channels #8~#11 constitute a sub-band #2, and sub-channels #12~#15 constitute a sub-band #3.

As described above, the entire band is composed of 4 sub-bands, and each sub-band is a unit in which frequency selective resource allocation is performed. Of the slots, slots #1, #5, #9, #13, . . . are slots for which WBH-HARQ is used. This is shown by reference numeral 505. In a slot #0, the BS allocates sub-channels to MS1 506~MS4 509. In the example of FIG. 5, in the slot #0, the BS allocates the sub-channel #15 to the MS1 506, allocates the sub-channel #14 to the MS2 507, allocates the sub-channel #13 to the MS3 508, and allocates the sub-channel #12 to the MS4 509. That is, the BS allocates, to the 4 MSs, some sub-channels of the slot for which SBH-HARQ is used. Therefore, the 4 MSs transmit data while performing HARQ and frequency hopping through the slots for which SBH-HARQ is used, in the sub-bands (all correspond to the sub-band #3 in the example of FIG. 5) corresponding to their allocated sub-channels. The MSs, allocated channels in the sub-bands, perform frequency hopping using the sub-band hopping sequence. For the MS1 506, the local hopping sequence is 3-1-0-2, and the sub-band hopping sequence is fixed to 3-3-3-3. As another example, the global hopping sequence for the MS1 506 can be expressed as 15-13-12-14.

In a slot #1, the BS allocates sub-channels to MS5 510~MS8 513. In the example of FIG. 5, in the slot #1, the BS allocates the sub-channel #14 to the MS5 510, allocates the sub-channel #12 to the MS6 511, allocates sub-channel #9 to the MS7 512, and allocates the sub-channel #4 to the MS8 513. That is, the BS allocates, to the 4 MSs, some sub-channels of the slot for which WBH-HARQ is used. Therefore, the 4 MSs transmit data while performing HARQ and wide-band frequency hopping through the slots for which WBH-HARQ is used. The hopping sequence used in this case is the global hopping sequence.

3. Third Embodiment

A difference between the third embodiment and the first embodiment is that the local hopping sequence is not fixed in terms of the time. An example of the fixed local hopping sequence can include a sequence such as 2-2-2-2. That is, an MS, allocated a sub-channel in a sub-band, hops to an unfixed local hopping sequence in the sub-band. An MS performing global hopping (global hopping MS) first performs local hopping through the local hopping sequence, and then hops to the same or different sub-band through sub-band hopping. In addition to this difference, the third embodiment has the following characteristics.

First, an amount of a sub-band is determined between a transmitter and a receiver. The determination is performed so a BS provides information on the amount of the sub-band to all MSs in its system. For example, if the determination is made so the entire system band is 10 MHz and the sub-band is 625 KHz, there are 16 sub-bands in the entire system band.

Second, the entire system band is divided into a band for WBH-HARQ and a band for SBH-HARQ. The band for WBH-HARQ is characterized in that it is uniformly distributed over the entire band, and the band for SBH-HARQ is characterized in that it is a band except for the band for WBH-HARQ in a particular sub-band.

Third, the BS allocates a part or all of the band for WBH-HARQ to each MS, or allocates a part or all of the band for SBH-HARQ to each MS. The BS can allocate both of a part or all of the band for WBH-HARQ, and a part or all of the band for SBH-HARQ, to one MS.

Fourth, an MS, allocated a part or all of the band for WBH-HARQ, transmits data while performing HARQ and frequency hopping restrictively on the band for WBH-HARQ. In this case, the BS and the MS perform hopping according to a rule defined by a global hopping sequence between them. The global hopping sequence is composed of first performed local hopping and its successively performed sub-band hopping. In each hopping, mapping between logical channels and physical channels, and mapping between a sub-band over which logical channels are transmitted and a sub-band over which physical channels are transmitted, are defined as a local hopping sequence and a sub-band hopping sequence, respectively. An MS, allocated a part or all of the band for SBH-HARQ, performs an HARQ operation while performing frequency hopping in the sub-band corresponding to the allocated band. In this case, the MS performs the frequency hopping operation on a band except for the band designated for WBH-HARQ in the sub-band. Similarly, the BS and the MS perform intra-sub-band hopping, i.e. local hopping, according to a rule defined by a local hopping sequence between them.

Figure 10:
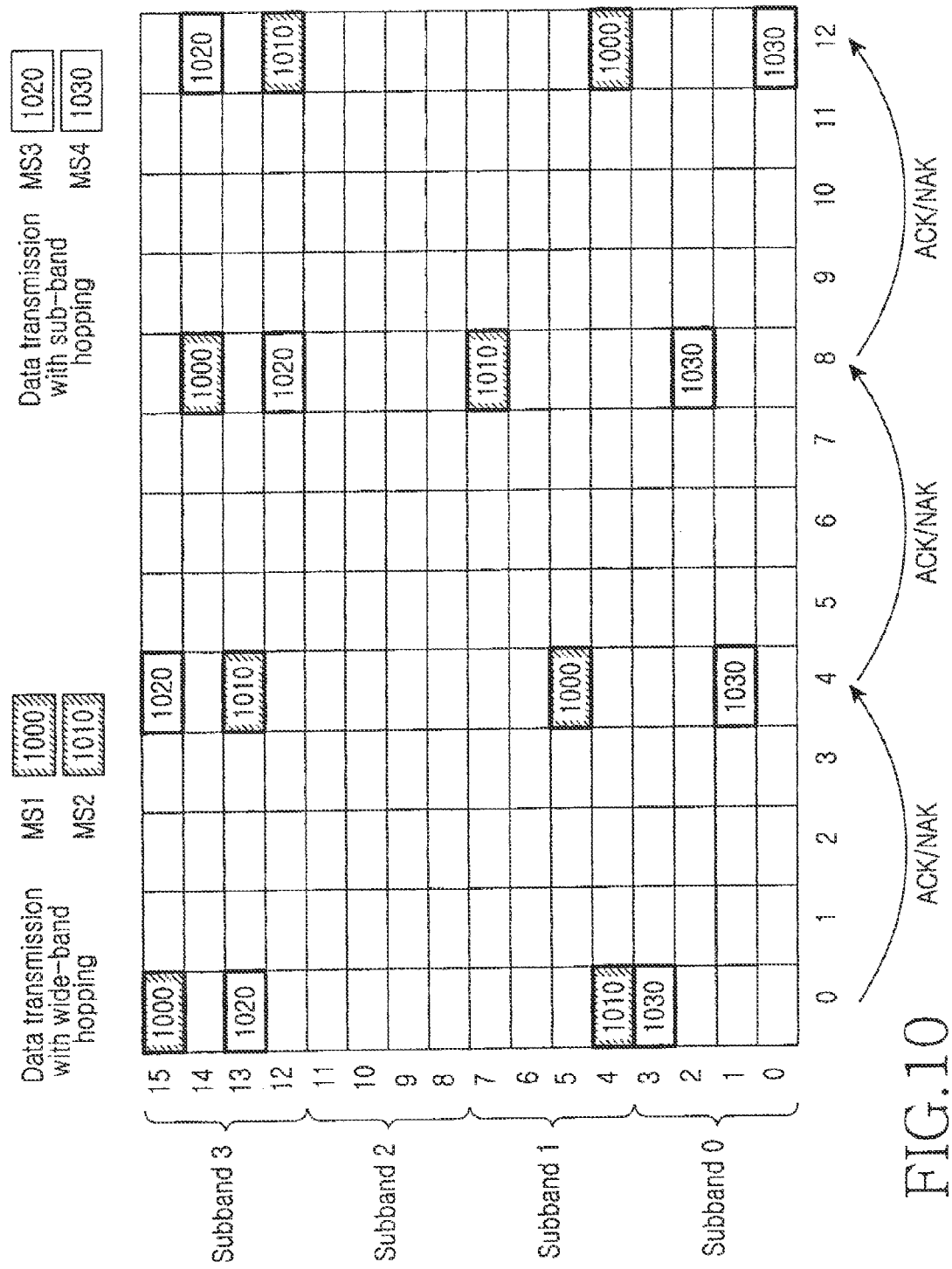
FIG. 10 illustrates global hopping and local hopping performed according to a third embodiment of the present invention.

FIG. 10 shows global hopping and local hopping performed according to a third embodiment of the present invention.

If it is assumed that an MS1 1000, an MS performing global hopping (hereinafter, global hopping MS for short), is allocated a logical channel A, the logical channel A is mapped to the physical channel #15 in the slot #0, and mapped to the physical channel #5 in the slot #4. In addition, the logical channel A is mapped to the physical channel #14 and the physical channel #4 in the slot #8 and the slot #12, respectively. This can be expressed that as the local hopping sequence is defined as 3-1-2-0 and the sub-band hopping sequence is defined as 3-2-3-2, two-step hopping has been performed. In the concept presented in FIG. 10, because there are only two global hopping MSs, one sub-channel in each of two sub-bands is allocated for each MS. The global hopping is performed, hopping between the two allocated sub-bands, i.e. the sub-band #1 and the sub-band #3. If 4 MSs are performing global hopping (i.e. if there are 4 global hopping MSs), one sub-channel is allocated per sub-band, and the global hopping can be performed over the entire band. In addition, if only one MS performs global hopping, the MS performs hopping only within a specific sub-band. In this case, there is a possible difference between global hopping and local hopping. The sub-band possibly used for hopping is determined according to the number of global hopping MSs in order to prevent possible collision between the global hopping MS and an MS performing local hopping (local hopping MS).

In FIG. 10, an MS3 1020 and an MS4 1030 are local hopping MSs. For the MS3 1020, the sub-band used for performing hopping is fixed to sub-band #3, and the local hopping sequence is defined as 1-3-0-2. Of course, the sequence is given by way of example. That is, the sequence can be defined as different values. For the MS4 1030, the hopping is limited to the sub-band #0 and the local hopping sequence is defined as 3-1-2-0.

4. Fourth Embodiment

A difference between the fourth embodiment and the third embodiment is in that when multiple bands for WBH-HARQ are allocated, multiple users can simultaneously transmit signals through sub-channels constituting the bands. If there are 4 users and a BS selects one sub-channel from each of 4 sub-bands as 4 sub-channels for WBH-HARQ and allocates the selected sub-channels to the 4 users, the BS can simultaneously transmit the 4 sub-channels to the 4 users. In addition to this difference, the fourth embodiment has the following characteristics.

First, an amount of a sub-band is determined between a transmitter and a receiver. The determination is performed in such a manner that a BS provides information on the amount of the sub-band to all MSs in its system. For example, if the determination is made so the entire system band is 10 MHz and the sub-band is 625 KHz, there are 16 sub-bands in the entire system band.

Second, the entire system band is divided into a band for WBH-HARQ and a band for SBH-HARQ. The band for WBH-HARQ is characterized in that it is uniformly distributed over the entire band, and the band for SBH-HARQ is characterized in that it is a band except for the band for WBH-HARQ in a particular sub-band.

Third, the BS allocates a part or all of the band for WBH-HARQ to each MS, or allocates a part or all of the band for SBH-HARQ to each MS. The BS can allocate both of a part or all of the band for WBH-HARQ, and a part or all of the band for SBH-HARQ, to one MS.

Fourth, an MS, allocated a part or all of the band for WBH-HARQ, transmits data while performing HARQ and frequency hopping restrictively on the band for WBH-HARQ. An MS, allocated a part or all of the band for SBH-HARQ, performs an HARQ operation while performing frequency hopping in the sub-band corresponding to the allocated band. In this case, the MS performs the frequency hopping operation on a band except for the band designated for WBH-HARQ in the sub-band.

Figure 11:
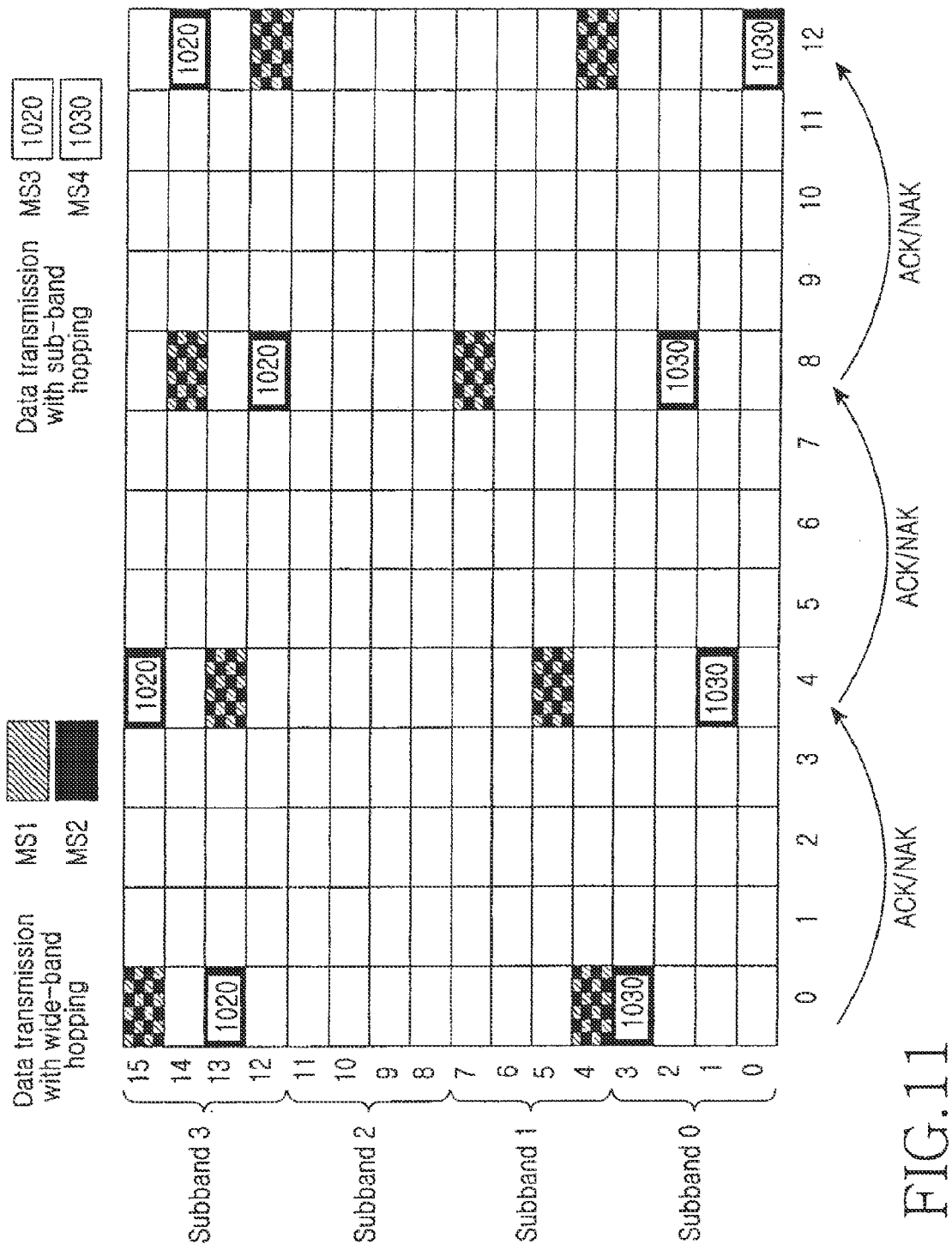
FIG. 11 illustrates global hopping and local hopping performed according to a fourth embodiment of the present invention.

FIG. 11 shows global hopping and local hopping performed according to a fourth embodiment of the present invention. An operation of local hopping MSs, i.e. an MS3 1020 and an MS4 1030, is the same as that described in the third embodiment of the present invention, so a description thereof will be omitted. In this embodiment, for two MSs, i.e. MS1 and MS2, performing global hopping or wide-band hopping, one sub-channel is allocated in each of a sub-band #1 and a sub-band #3. The difference from the other embodiments is in that data of the MS1 and the MS2 can be multiplexed in each sub-channel before being transmitted. Although it is shown in FIG. 10 that two MSs share basic resources (sub-carriers and OFDM symbols) of each channel using a specific pattern, this means that signals from multiple MSs are multiplexed regardless of the type, and includes all such methods. The MS1 and the MS2 perform global hopping, but because transmission data is already simultaneously transmitted in multiple bands, it can be considered that the sub-band hopping sequence is fixed to a particular value.

The local hopping sequence of the MS1 and the MS2 is defined as 0-1-3-0 in the sub-band #1, and defined as 3-1-2-0 in the sub-band #3, and sub-band hopping sequences of the MS1 and the MS2 are fixed to 1-1-1-1 and 3-3-3-3, respectively. That is, even the global hopping MSs also perform only the local hopping, but because the transmission data is already scattered over multiple bands, it can be considered as global hopping. The physical channel used for global hopping is fixed even in the fourth embodiment, as done in the third embodiment, and this is to prevent the possible collision with physical channels used for local hopping rather than global hopping. In FIG. 11, there are only two global hopping MSs, i.e. MS1 and MS2. If four MSs perform global hopping, one physical channel will be allocated for global hopping in each sub-band, and data of the four MSs will be simultaneously transmitted through the physical channels. That is, the amount of data per MS, transmitted over one physical channel, decreases, but the number of physical channels used for global hopping increases. As a result, the amount of transmission data per MS is constant.

Extension of the fourth embodiment can enable the following operation. Until a particular slot, the number of physical channels allocated for global hopping is N, but after the particular slot, the number of physical channels increases to M (>N). As a result, data of the global hopping MSs, which is simultaneously transmitted over the N channels, can be simultaneously transmitted over the M channels after the particular slot.

Figure 6:
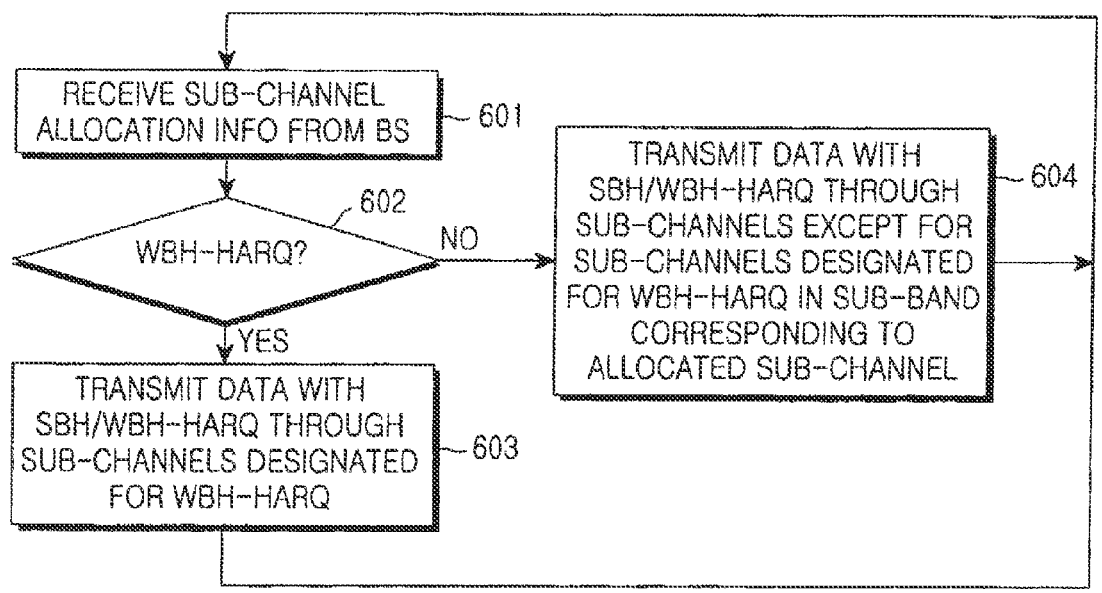
FIG. 6 illustrates a process of transmitting data by an MS using resources allocated according to the first, third and fourth embodiments of the present invention.
Figure 7:
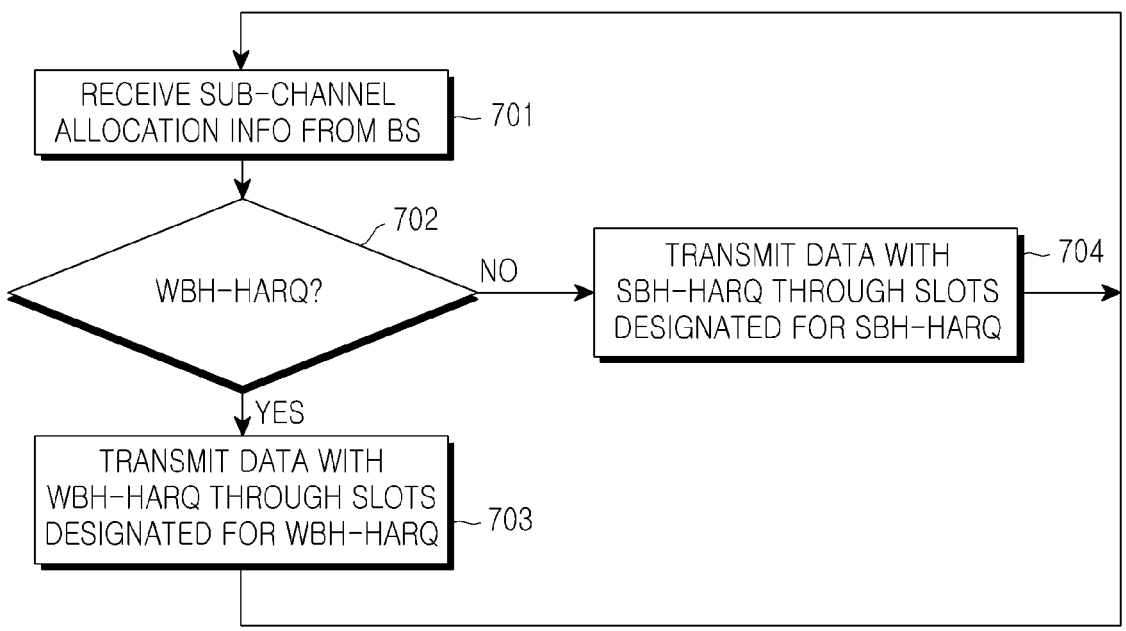
FIG. 7 illustrates a process of transmitting data by an MS using resources allocated the second embodiment of the present invention.

With reference to FIGS. 6 and 7, a description will now be made of a process in which MSs transmit/receive data with resources allocated according to the first to fourth embodiments.

FIG. 6 shows a process of transmitting data by an MS using resources allocated according to the first, third and fourth embodiments of the present invention. The MS is allocated a sub-channel from a BS in step 601. It is assumed that before the MS is allocated the sub-channel, configuration information of the entire band and each sub-channel is previously shared between the BS and the MS. The configuration information of the entire band and each sub-channel, shared between the BS and the MS, can be transmitted from the BS to the MS over a common channel or its similar channel. In this state, upon receipt of sub-channel allocation information, the MS determines in step 602 whether the allocated sub-channel is a sub-channel designated for WBH-HARQ. If it is determined that the allocated sub-channel is a sub-channel designated for WBH-HARQ, the MS proceeds to step 603. Otherwise, the MS proceeds to step 604.

In step 603, the MS transmits data while performing frequency hopping and HARQ (SBH/WBH-HARQ) through sub-channels designated for WBH-HARQ. However, if it is determined in step 602 that the allocated sub-channel is not a sub-channel designated for WBH-HARQ, the MS proceeds to step 604 where it transmits data using SBH/WBH-HARQ through the remaining sub-channels except for the sub-channels designated for WBH-HARQ in the sub-band corresponding to the allocated sub-channel. This data transmission scheme has been described with reference to FIG. 4.

FIG. 7 shows a process of transmitting data by an MS using resources allocated by the second embodiment of the present invention. The MS is allocated a sub-channel from a BS in step 701. It is assumed that before the MS is allocated the sub-channel, configuration information of the entire band and each sub-channel is previously shared between the BS and the MS. The configuration information of the entire band and each sub-channel, shared between the BS and the MS, can be transmitted from the BS to the MS over a common channel or its similar channel. Thereafter, the MS determines in step 702 whether the allocated sub-channel exists in a slot designated for WBH-HARQ. If it is determined that the allocated sub-channel is a sub-channel in the slot designated for WBH-HARQ, the MS proceeds to step 703. Otherwise, the MS proceeds to step 704.

In step 703, the MS transmits data while performing wide-band frequency hopping and HARQ (WBH-HARQ) through the slots designated for WBH-HARQ. However, if it is determined in step 702 that the allocated sub-channel is not a sub-channel in the slot designated for WBH-HARQ, the MS proceeds to step 704 where it transmits data using sub-band frequency hopping and HARQ (SBH-HARQ) through the slots designated for SBH-HARQ.

Figure 8:
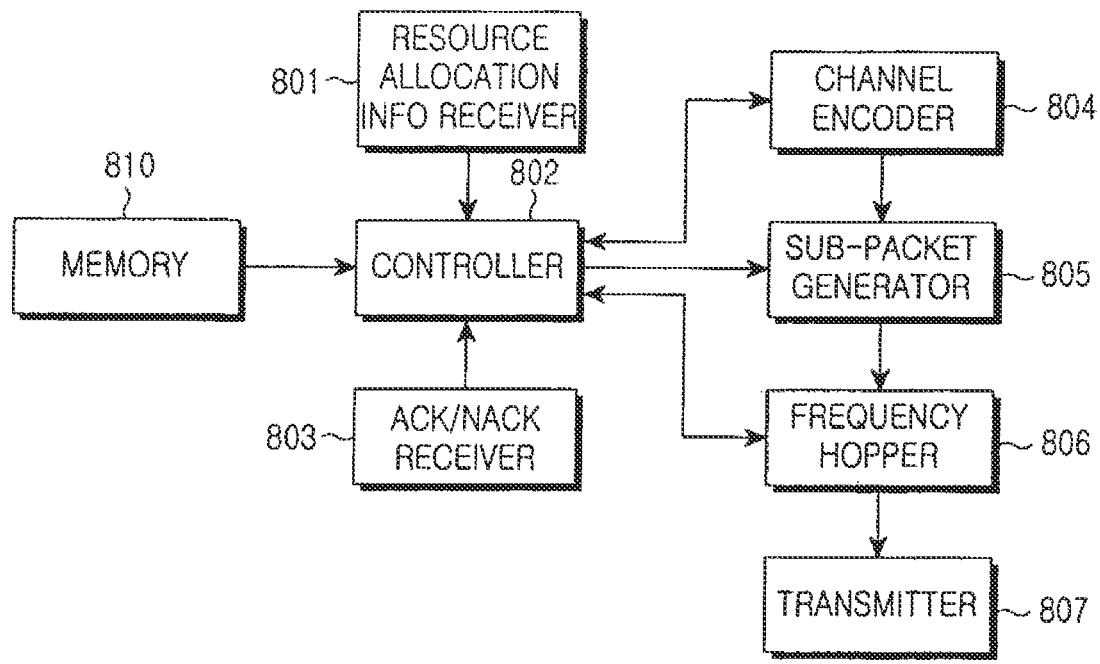
FIG. 8 illustrates a data transmitter according to the present invention.

FIG. 8 shows a data transmitter according to the present invention. The transmitter includes a resource allocation information receiver 801, a controller 802, an ACK/NACK receiver 803, a channel encoder 804, sub-packet generator 805, a frequency hopper 806, a transmitter 807, and a memory 810. The resource allocation information receiver 801 is a block for receiving information on resources allocated to the data transmitter. For example, if the transmitter is a BS, the resource allocation information receiver 801 receives resource allocation information transmitted from a BS scheduler (not shown in FIG. 8), and provides the information to the controller 802.

Then the controller 802 outputs transmission data stored in the memory 810 to the channel encoder 804 based on the information received from the resource allocation information receiver 801. The channel encoder 804 performs a specific channel coding process on the transmission data. The channel encoder 804 can include at least one of a convolutional encoder, a turbo encoder, a Low Density Parity Check (LDPC) encoder, etc. The channel encoder 804, under the control of the controller 802, outputs specific coded symbols. In FIG. 8, the sub-packet generator 805 is a block for generating a sub-packet using the output of the channel encoder 804. The sub-packet generator 805 operates under the control of the controller 802, and the controller 802 controls the sub-packet generator 805 depending on ACK/NACK feedback information, which is received from the ACK/NACK receiver 803 in response to the previously transmitted sub-packet. The output symbols of the sub-packet generator 805 are input to the frequency hopper 806. The frequency hopper 806 operates under the control of the controller 802. The controller 802 controls the frequency hopper 806 in the operation of FIG. 4 or FIG. 5. The output of the frequency hopper 806 is input to the transmitter 807, and the transmitter 807 transmits data with a particular method. The channel encoder 804, the sub-packet generator 805 and the frequency hopper 806 constitute a 'transmission data generator'.

Figure 9:
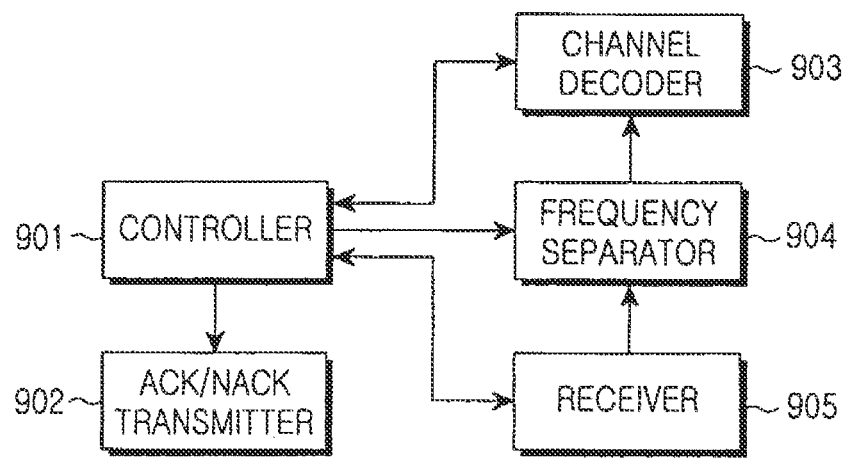
FIG. 9 illustrates a data receiver according to the present invention.

FIG. 9 shows a data receiver according to the present invention. The receiver includes a controller 901, an ACK/NACK transmitter 902, a channel decoder 903, a frequency separator 904, and a receiver 905. In FIG. 9, the receiver 905 is a block for receiving a radio signal and converting it into a baseband signal. The output of the receiver 905 is input to the frequency separator 904. The frequency separator 904 operates under the control of the controller 901. The controller 901 controls the frequency separator 904 using a current frequency hopping pattern. That is, as described in FIGS. 4 and 5, the controller 901 processes only the frequency transmitted to the receiver itself. This processing operation has been described in FIGS. 6 and 7. The output of the frequency separator 904 is input to the channel decoder 903 where it undergoes a specific channel decoding process. Based on the output of the channel decoder 903, the receiver determines whether data reception is successfully performed, and provides the result to the controller 901. Then the controller 901 determines which of ACK/NACK signals it will transmit, depending on the information received from the channel decoder 903, and controls the ACK/NACK transmitter 902 according to the determination. The ACK/NACK transmitter 902 transmits the ACK/NACK signals under the control of the controller 901.

As can be understood from the foregoing description, in the FDMA wireless communication system, the use of the present invention in allocating resources can contribute to an increase in system capacity. In addition, the use of the resource allocation method can facilitate stability acquisition for data transmission.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for transmitting an uplink data by a mobile station in a wireless communication system, comprising:
    receiving hopping-related information from a base station;
    receiving resource allocation information from the base station; and
    transmitting the uplink data through at least one resource determined based on a sequence for sub-band hopping and a sequence for local hopping.

2. The method of claim 1, wherein the sequence for sub-band hopping and the sequence for local hopping are agreed between the base station and the mobile station.

3. The method of claim 1, wherein the sub-band hopping and the local hopping are performed in units of slots.

4. A method for receiving an uplink data by a base station in a wireless communication system, comprising:
    transmitting hopping-related information to a mobile station;
    transmitting resource allocation information to the mobile station; and
    receiving the uplink data through at least one resource determined based on a sequence for sub-band hopping and a sequence for local hopping.

5. The method of claim 4, wherein the sequence for sub-band hopping and the sequence for local hopping are agreed between the base station and the mobile station.

6. The method of claim 4, wherein the sub-band hopping and the local hopping are performed in units of slots.

7. An apparatus for transmitting an uplink data in a wireless communication system, comprising:
    a receiver for receiving resource allocation information and hopping-related information from a base station;
    a controller for determining at least one resource for transmitting the uplink data based on a sequence for sub-band hopping and a sequence for local hopping; and
    a transmitter for transmitting the uplink data through the determined at least one resource.

8. The apparatus of claim 7, wherein the sequence for sub-band hopping and the sequence for local hopping are agreed between the base station and the mobile station.

9. The apparatus of claim 7, wherein the sub-band hopping and the local hopping are performed in units of slots.

10. An apparatus for receiving an uplink data in a wireless communication system, comprising:
    a transmitter for transmitting resource allocation information and hopping-related information to a mobile station;
    a controller for determining at least one resource for receiving the uplink data based on a sequence for sub-band hopping and a sequence for local hopping; and
    a receiver for receiving the uplink data through the determined at least one resource.

11. The apparatus of claim 10, wherein the sequence for sub-band hopping and the sequence for local hopping are agreed between the base station and the mobile station.

12. The apparatus of claim 10, wherein the sub-band hopping and the local hopping are performed in units of slots.

13. A method for transmitting an uplink data by a mobile station in a wireless communication system, comprising:
    receiving hopping-related information from a base station;
    receiving resource allocation information from the base station; and
    transmitting the uplink data through at least one resource of sub-bands designated by the base station.

14. A method for receiving an uplink data by a base station in a wireless communication system, comprising:
    transmitting hopping-related information to a mobile station;
    transmitting resource allocation information to the mobile station; and
    receiving the uplink data through at least one resource of sub-bands determined by the base station.

15. An apparatus for transmitting an uplink data in a wireless communication system, comprising:
    a receiver for receiving resource allocation information and hopping-related information from a base station;
    a controller for determining at least one resource for transmitting the uplink data in sub-bands designated by the base station; and
    a transmitter for transmitting the uplink data through the determined at least one resource.

16. An apparatus for receiving an uplink data in a wireless communication system, comprising:
    a transmitter for transmitting resource allocation information and hopping-related information to a mobile station;
    a controller for determining at least one resource of sub-bands for receiving the uplink data; and
    a receiver for receiving the uplink data through the determined at least one resource.

* * * * *